3,169,971
α-ALKYL HISTIDINES
Meyer Sletzinger, North Plainfield, and Karl Pfister, Westfield, N.J., assignors to Merck & Co., Inc., Rahway, N.J., a corporation of New Jersey
No Drawing. Filed June 28, 1961, Ser. No. 120,175
7 Claims. (Cl. 260—309)

This application is a continuation-in-part of our co-pending application, Serial No. 50,576, filed August 19, 1960, now abandoned.

This invention relates to new amino acids and to antihistaminic compositions and to methods of inhibiting the formation of histamine. More specifically, this invention relates to α-alkyl histidines and their lower alkyl esters and the non-toxic salts thereof. Such compounds can be illustrated by the formula—

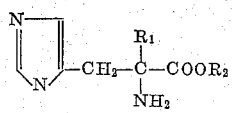

in which $R_1$ is lower alkyl and $R_2$ may be hydrogen or lower alkyl. More specifically, also, it relates to antihistaminic compositions containing the above compounds and to the method of inhibiting the formation of histamine by administering these compounds in unit dosage form.

The knowledge that histamine or a histamine-like substance is released in tissues in allergic reactions has led to the development of compounds that are histamine antagonists. These drugs, when given orally, subcutaneously, intraperitoneally or intravenously to a guinea pig, prevent histamine shock and bronchospasm from aerosolized histamine. They further inhibit histamine whealing on human skin and prevent histamine asthma in man. Some actions, however, of histamine, such as the stimulation of salivation and gastric secretion, are not inhibited by antihistaminic drugs.

We have found a new class of antihistaminically active compounds whose apparent mode of action is different from that heretofore known to the art. We have found that α-alkyl histidines and their esters are strong antihistaminics, apparently with a different mode of action than those heretofore known. This mode of action is believed to be the blocking of histamine formation by the inhibition of histidine decarboxylase. These compounds, thus, are antimetabolites instead of being antagonists, as are the known antihistaminics. We have thus further found new antihistaminic compositions comprising α-alkyl histidines and their esters and a pharmaceutical carrier, and also a new method of inhibiting the formation of histamine by administering α-alkyl histidines in unit dosage form.

The compounds of our invention are prepared by the series of reactions shown schematically in the chemical flow sheet of Table I. In this method of preparation an α-bromoalkanoyl bromide is converted to an ester and the α-bromo is then replaced by a nitro group. The nitro ester is then condensed with chloromethylimidazole and the nitro group is reduced. Saponification of the ester then gives the α-alkyl histidines. Normally, the benzyl ester is used in this synthesis because it is easily cleaved, and this is what is shown in Table I. However, any other aliphatic ester can equally well be used. The nature of the esterifying group is unimportant when the free acid is desired other than with respect to the ease of cleavage. When an ester of the α-alkyl histidines is desired, it can be prepared from the free acid by reesterification with a lower alkanol or it can be prepared directly by using the proper nitro ester in the condensation with the chlormethylimidazole. The compounds of our invention include α-methylhistidine, α-ethylhistidine, α-propylhistidine, α-butylhistidine, α-amylhistidine, and their respective methyl, ethyl, propyl, butyl or amyl esters.

TABLE I

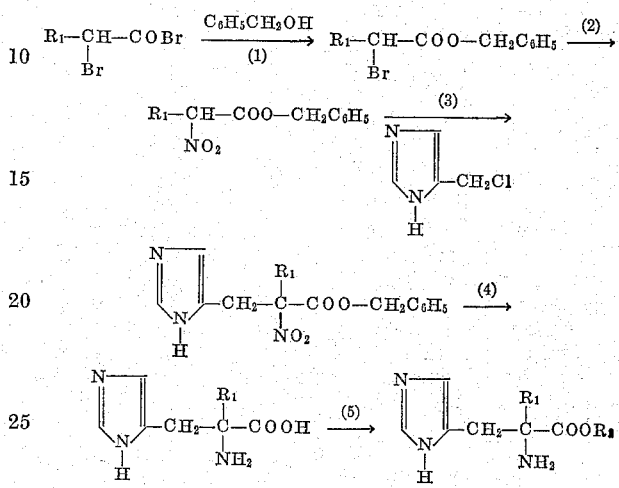

Definitions:
$R_1$ = lower alkyl.
$R_2$ = lower alkyl (in the claims it stands for H as well).
Reagents:
(1) Pyridine and toluene, reflux.
(2) $NaNO_2$, phloroglucinol, dimethylformamide.
(3) Sodium hydride in DMF.
(4) Hydrogen, Raney nickel, then HCl.
(5) Alkanol plus HCl.

NOTE.—If $R_2OH$ is used in place of $C_6H_5CH_2OH$, the product from Reaction 3 will be the same ester which is shown above being produced from Reaction 5 and the latter plus Reaction 4 will not be needed.

The esters of the amino acid are readily prepared from the free acids by esterification with a lower alkanol in the presence of a catalytic amount of sulfuric acid, hydrochloric acid, hydrobromic acid and the like. More conveniently, they are prepared directly in the synthesis. The esters are especially useful in that one obtains much better absorption of the compound in the body and much more prolonged activity with smaller and less frequent dosage. The esters, especially, can be used in the form of non-toxic salts such as the hydrobromide, hydrochloride, sulfate and the like. These salts are water soluble and are the form in which the ester first is formed. If the free amino ester is desired, it is obtained by basification of the salt formed during the preparation. It, too, can be used therapeutically.

In their use as antihistaminics, the compounds of our invention are used in humans in dosages ranging from 0.5 to 25.0 g. per day, usually orally. In animals, dosages range from 10 to 350 mg. per kg. weight. Preferably, they are used in the range of 2–10 g. per day, usually in frequent small dosages, probably not more than a couple of hours apart. More or less frequent and larger and smaller unit dosages are, of course, also possible. These compounds can be mixed with any of the conventional ingredients for tablets. The compounds can also be applied parenterally in standard pharmaceutical carriers for such application. They can also be administered in capsules. All these methods are intended to be covered by the term pharmaceutical carrier.

These compounds are also useful as intermediates in the preparation of norepinephrine-like compounds. Such compounds can be prepared by decarboxylation of the amino acid, followed by hydroxylation on the β-carbon of the resulting amine. The decarboxylation can be carried out by the use of an enzyme catalyst (e.g., histidine decarboxylase, obtainable from evaporation of the aqueous extract of ground hog or beef kidney, ground blood platelets, and other known sources). The amino acid is heated at 37° C. with the enzyme and the co-enzymic pyridoxyl phosphate in an aqueous medium buffered at a pH of 6.8, to give the corresponding amine. Hyroxylation on the β-carbon can be achieved by one of several methods. One such is an enzymatic conversion by heating in a pH 6.8 buffered aqueous medium in the presence of slices of mammalian liver. Such a method is similar to that shown by Senoh et al., J. Am. Chem. Soc. 81, 6236 (1959), for dopamine. Another method is the chemical processes shown by Senoh and Witkop (J. Am. Chem. Soc. 81, 6222) (1959), or adaptations thereof. The resulting products are related to norepinephrine in the same way that the amino acid is related to dihydroxyphenylalanine. Compounds of the structure of the norepinephrine type are known to have utility as pressor agents and the compounds of this invention are thus valuable intermediates in the preparation of such compounds.

The α-alkylhistidines can also be used as intermediates for the corresponding α-alkyl-α-hydrazino-β-imidazolyl propionic acids which are also potent inhibitors of histidine decarboxylase. The conversion is carried out by treating an α-alkyl histidine with sodium nitrite in the presence of hydrochloric acid. The amino group is thus replaced by chlorine. The α-chloro acid thus produced is then reacted with hydrazine to form the α-hydrazino acid.

*Example 1*

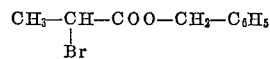

To a mixture of 42.8 g. of benzyl alcohol, 21.8 g. of pyridine and 225 cc. of toluene, there is added with vigorous stirring, 60 g. of α-bromo propionyl bromide, dropwise, over 30 minutes while keeping the temperature of the mixture at 20–25° C. The mixture is then heated to reflux for 4 hours, with good agitation. The reaction mixture is cooled to 15–20° C. and 100 ml. of water is added. The toluene layer is separated and the aqueous layer is extracted with 50 cc. of toluene. The combined solutions are then washed with water until neutral and dried over anhydrous sodium sulfate. The dry toluene solution is then concentrated in vacuo and the residual material is distilled. The material has a boiling point of 86.89° and 0.1 mm. is collected. This is the benzyl-α-bromopropionate.

When, in the above procedure, equivalent quantities of α-bromobutyrlbromide, α-bromovaleryl bromide, α-bromocaproylbromide and α-bromoheptoyl bromide are used in place of the α-bromopropionylbromide, the corresponding benzyl-α-bromo esters are obtained.

The corresponding ethyl α-bromopropionate and the ethyl esters of the other acids are obtained when an equivalent quantity of ethyl alcohol is used in place of the benzyl alcohol in the above procedure.

*Example 2*

$$CH_3-CH-COO-CH_2-C_6H_5$$
$$|$$
$$NO_2$$

To a well-stirred slurry of 37.3 g. of sodium nitrite, 42 g. of anhydrous glucinol in 625 ml. of dimethylformamide, there is added over 3–5 minutes at 25° C. 76 g. of the product of Example 1. The mixture is stirred at 25° C. for 18 hours, then poured into 1600 ml. of ice water and 300 ml. of ether, with good agitation. The ether layer is separated and the aqueous layer is extracted three times with 300 ml. of ether. The combined ether layers are washed five times with 300 ml. of water and then dried over magnesium sulfate. The dry extract is concentrated and the residual oil is fractionated through a packed column. The α-nitro ester is obtained at a boiling range of 125–126° C. at 1.5 mm.

Similarly, when the corresponding α-bromo-butyryl ester, α-bromovaleryl ester, α-bromocaproyl and β-heptoyl ester are substituted in equivalent quantities for the α-nitropropionyl ester, the corresponding α-nitro esters are obtained.

When the corresponding ethyl ester of any of the above bromo acids is used in place of the benzyl ester, in equivalent quantity, in the above procedure, the ethyl α-nitro esters are obtained.

*Example 3*

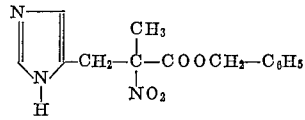

A mixture of 12.8 g. of sodium hydride and 540 cc. of dimethyl formamide is stirred vigorously for 30 minutes at 25° C. and then cooled to 10° C. To this mixture is added 28.8 g. of the nitro ester produced in Example 2. The reaction is stirred at room temperature for 5 hours and then rechilled to 5° C. To this slurry is added, over 3–5 minutes, a solution of 21 g. of chloromethylimidazole (prepared by the procedure in Organic Syntheses, vol. 24, page 64), 210 cc. of dimethyl formamide. The reaction mixture is stirred for 18 hours at 25° C. and then cooled to 5° C. While the temperature of the mixture is held below 20° C. when cooling, 5 cc. of cold water is added. The reaction mixture is then diluted with an additional 3 liters of water and the product is extracted with 3 portions of ether. The combined ether extracts are then washed five times with a liter of water in order to remove dimethyl formamide, and dried over anhydrous magnesium sulfate. The dried extract is concentrated until crystallization begins and then cooled at 0°. The α-nitro-α-methyl-β-4-imidazolyl propionic ester is isolated by filtration, washed with ether and dried.

When in the above procedure an equivalent quantity of the α-nitrobutyryl, α-nitrovaleryl, α-nitrocaproyl or α-nitroheptoyl ester prepared in Example 2 is substituted for the α-nitro propionate, the corresponding α-alkyl-β-imidazolyl ester is obtained.

When, in the above procedure, the corresponding ethyl α-nitro ester is used in equivalent quantity in place of the benzyl ester, the corresponding ethyl α-nitro-α-alkyl-imidazolyl alkanoate is obtained. Similarly, the other lower alkyl esters of these alkanoates are obtained by the starting Example 1 with the corresponding alkanol instead of ethanol or benzyl alcohol, and following the procedures of Examples 1 and 2 and then the above procedure.

*Example 4*

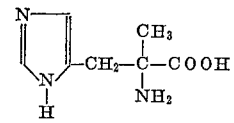

A pressure bomb is charged with a mixture of 5.35 g. of the α-nitro-α-methyl-β-imidazolyl propionic acid benzyl ester, prepared in Example 3, 250 ml. of methanol and one teaspoon of Raney nickel. The bomb is purged with an excess of hydrogen and then sealed and agitated until the absorption of hydrogen has ceased. The reaction mixture is then filtered to remove the catalyst and the filtrate is acidified to a pH of 2 with a solution of hydrogen chloride in methanol. The solution is concentrated in vacuo to dryness keeping the temperature below 40° C. The α-amino ester residue is then mixed with 75 cc. of concentrated hydrochloric acid and the mixture is refluxed for 18 hours. The mixture is then cooled to 25° C. and extracted five times with 50 ml. of ether. The aqueous solution is concentrated in a vacuum to a volume of 15 cc. and the pH is adjusted to 5–6, with ammonium hydroxide. Upon the addition of 300 ml. of acetone to this solution, and standing, a white crystalline precipitate of the α-methyl histidine separates. This is isolated by filtration and washed with acetone.

When the ethyl and other lower alkanol esters of the α-nitro-α-methyl propionic acid are used in equivalent quantity in place of the benzyl ester, in the above procedure, the corresponding lower alkyl esters of α-methyl histidine are obtained as the hydrochloride after the evaporation to dryness of the alcoholic reaction filtrate.

*Example 5*

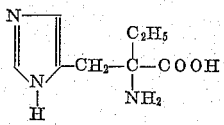

The procedure of Example 4 is followed using an equivalent quantity of the benzyl-α-nitro-α-ethyl-β-4-imidazolyl propionate prepared in Example 3. Similarly, when the corresponding α-propyl, α-butyl and α-amyl esters are substituted in equivalent quantities for the α-methyl ester, the corresponding α-alkyl histidine is obtained.

When the ethyl and other lower alkanol esters of the α-nitro α-alkyl propionic acids are used in place of the benzyl ester, in equivalent amounts, as in Example 4, the corresponding lower alkyl esters of the α-alkyl histidine are obtained as the hydrochloride.

*Example 6*

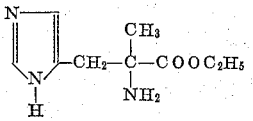

300 ml. of absolute ethanol are saturated by dihydrogen chloride at 0° and 7 g. of α-methyl hydrochloride monohydrate (prepared in Example 4) is added. The reaction mixture is refluxed for 5 hours and then allowed to stand one day at room temperature. The solvent is removed in vacuo and the residue is dissolved in 30 ml. of ethanol. The solution is diluted with 30 ml. of anhydrous ethyl acetate and the dihydrochloride of the ethyl ester of α-methyl-histidine is precipitated by slow addition of anhydrous ether. The product is isolated by filtration, washed with ether and dried.

When the product of Example 5 is substituted in equivalent quantities for the α-methylhistidine in the above procedure, the corresponding ester is obtained. Similarly, the corresponding esters of the α-propyl, α-butyl and α-amyl histidine are readily obtained.

When, in the above procedure, anhydrous methanol, propanol or butanol are substituted for the ethanol (and the time of refluxing is extended several-fold in the case of the higher alcohols), the corresponding methyl, propyl or butyl ester is obtained.

The products of this example are identical with those obtained in Examples 4 and 5 when the lower alkanol esters are used in place of the benzyl ester.

The free amines are obtained from these hydrochlorides by basification of their aqueous solution with sodium carbonate.

*Example 7*

α-Methylhistidine is ground to a fine powder and used to fill gelatin capsules. Capsules containing 250 mg. and 500 mg. are thus obtained. Similarly, α-ethyl histidine and α-propylhistidine are charged to capsules of the same sizes.

*Example 8*

Solutions of the hydrochloride of α-methylhistidine ethyl ester are prepared for intraperitoneal administration at a concentration of 25 mg. of the compound per milliliter of water. Pyrogen-free sterile distilled water is used. The solution is used to fill and seal ampules and vials under nitrogen.

*Example 9*

Mice are injected intraperitoneally with 30 mg./kg. of α-methylhistidine hydrochloride. Controls receive saline injection. After 30 minutes all mice are injected subcutaneously with 10 of $C^{14}$-L-histidine. Three days later the mice are sacrificed and the skins of batches of three mice are pooled and assayed for $C^{14}$ histamine. The composite result is that those injected with the α-methylhistidine show only 65% of the histamine shown by the controls.

We claim:

1. A compound selected from the group consisting of (1) compounds of the formula—

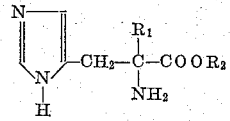

in which $R_1$ is lower alkyl and $R_2$ is selected from the group consisting of hydrogen and lower alkyl and (2) nontoxic water soluble mineral acid addition salts of the above compounds.

2. α-Methyl histidine.
3. α-Methyl histidine ethyl ester.
4. α-Methyl histidine ethyl ester hydrochloride.
5. α-Ethyl histidine.
6. α-Ethyl histidine ethyl ester.
7. α-Ethyl histidine ethyl ester hydrochloride.

References Cited by the Examiner

UNITED STATES PATENTS

| | | | |
|---|---|---|---|
| 2,275,623 | 3/42 | Gustus | 167—65 |
| 2,420,641 | 5/47 | Albertson et al. | 260—209 |
| 2,671,088 | 3/54 | Rimington et al. | 260—309 |
| 2,710,870 | 6/55 | Lawson | 260—309 |

OTHER REFERENCES

Chambers et al.: Journal Amer. Chem. Soc., volume 77, page 1525 (1955).

Robinson et al.: Jour. Chem. Soc., November 1961, pages 5037–38.

Smith: British Journal Pharmacol. Chem., volume 15, pages 319–27 (June 1960).

Sourkes: Archives Biochem. Biophys., volume 51, pages 444–56 (1954).

Weissbach et al.: Biochem. Biophys. Res. Communications, volume 3, pages 225–7 (August 1960).

WALTER A. MODANCE, *Primary Examiner*.

DUVAL T. McCUTCHEN, NICHOLAS S. RIZZO, JOHN D. RANDOLPH, *Examiners*.